Nov. 19, 1946.  O. SUTTLES  2,411,345
COOKING UTENSIL
Filed Oct. 11, 1943
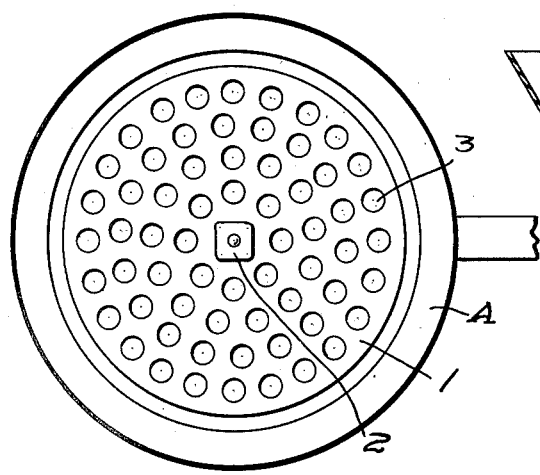
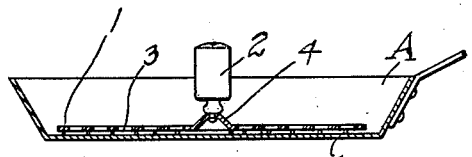
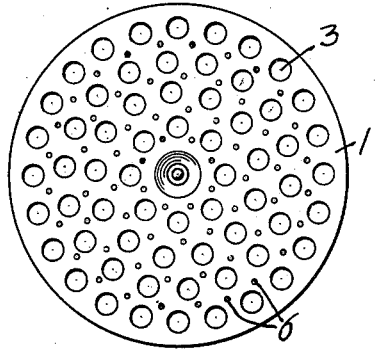
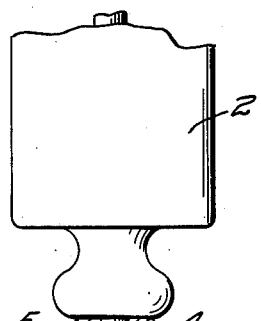
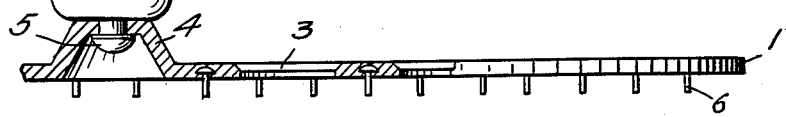
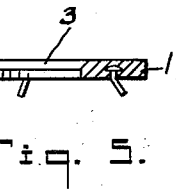
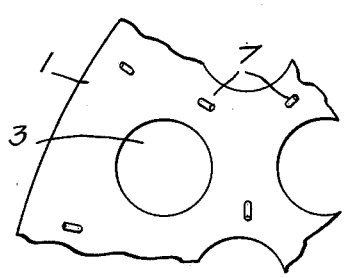
INVENTOR:
OMAR SUTTLES
BY
O. O. Martin.
ATTORNEY.

Patented Nov. 19, 1946

2,411,345

UNITED STATES PATENT OFFICE 2,411,345

COOKING UTENSIL

Omar Suttles, Los Angeles, Calif.

Application October 11, 1943, Serial No. 505,736

1 Claim. (Cl. 99—349)

The present invention relates to a device for use in cooking thin slices of meat.

Various difficulties are encountered in cooking, and particularly in frying thin slices of meat. Where the meat contains much fat, such as sliced bacon, it requires considerable skill to produce uniformly good results. This is due to the fact that the thin slices curl up and shrink in frying and that they, for this reason, do not become uniformly cooked, but some parts may become fried to a crisp while other parts thereof remain half-cooked, filled with grease. And such imperfectly cooked meat does not present an appetizing appearance. Nor does it satisfy the taste, or bring out the full quality of the meat.

Several attempts have been made to furnish attachments for skillets and other cooking utensils, in which such thinly sliced meat is cooked. But the difficulty with such devices as have come to my notice is that, although curling up of the sliced meat may be checked during the cooking, shrinkage is not prevented. And, when the time comes to remove the cooked meat, it is usually found that the slices curl up in the transfer from the skillet to a serving dish unless cooked until very crisp, in which case they usually are broken up in the handling thereof.

In view of the foregoing, it is the general object of my invention to provide means for use in connection with a cooking utensil for preventing both curling and shrinking of the thinly sliced meat. It is a further object to provide an attachment to a skillet or other cooking utensil which will maintain the cooking meat uncurled and substantially free from shrinkage. A still further object is to provide an attachment for a cooking utensil to which the cooked meat will adhere and, in adhering, will retain its shape while cooking and also while being removed from the utensil for transfer to a serving dish. Another object is to provide an attachment from which the adhering slices may be removed by a light tapping on or shaking of the device and without having to use other utensils for this purpose.

A drawing is hereto appended, in which preferred forms of the invention are illustrated, and reference is invited to the following detailed description of the devices illustrated.

In the drawing:

Fig. 1 is a plan view of a frying pan or skillet showing the device of the invention in position therein;

Fig. 2 is a substantially corresponding cross-sectional side view taken through the center thereof;

Fig. 3 shows the device of my invention removed from the skillet and turned upside down;

Fig. 4 is a fragmentary view, partly in section, of the device as shown in Fig. 2, but drawn on a much larger scale; and Figs. 5 and 6 are fragmentary views illustrating certain modifications embodied in the device, the importance of which is hereinafter fully explained.

The device, as illustrated in Figs. 1 to 4, comprises a circular disc 1, of a size to fit loosely within a cooking utensil which, in the drawing, takes the form of an ordinary frying pan A. The disc is centrally fitted with a handle 2, and it is made with a large number of perforations 3. The center portion of the disc is preferably raised, substantially as indicated at 4, in order to keep the projecting portion of the handle stem 5 well above the meat to be cooked.

It is most convenient, for the purposes of the invention, to use a cast iron or aluminum disc, as will presently appear, in addition to which such casting makes a better utensil because free from warping when exposed to heat in cooking. A large number of pins 6 project from the underside of the disc, and these pins may conveniently be set in the mold in which the casting is made, before the metal is poured, so that they may project from the bottom of the casting, substantially as indicated. Because it would be commercially impractical to set these pins to the correct depth in the mold, it is preferable to employ pins of sufficient length, and the ends of these pins are trimmed to the correct length after the casting leaves the mold. In doing this, it is important to remember that the pins must be trimmed to the same length in order that they may evenly penetrate the sliced meat and rest evenly on the bottom of the frying pan. When the pins are long enough completely to penetrate the sliced meat, it is seen that the weight of the disc is carried by these pins and does not press against the thin slices. This is an important feature of the invention.

The meat slices are first placed in the frying pan, preferably before it is set on the fire. The device, which for convenience may be termed the grid, is then placed on top of the slices and pressed thereagainst until the pins penetrate the slices. The fire is thereupon lit and the slices fried slowly or quickly, according to taste, until done. In curing meat, such as bacon and ham, some sugar is generally used to improve the flavor thereof. As this sugar melts, it has a tendency to cause the slices to stick to the pan, particularly if heated quickly, on a hot fire. In order to safeguard against such sticking, it is advisable to move the slices on the pan, and this is readily done by gripping the handle 2 and to twist it to rotate the grid back and forth. Because the projecting pins penetrate the slices, it is found that they carry with them the meat during such rotations. Preferably, the handle should not be of circular contour, but squared substantially as shown, or otherwise shaped so that the fingers will not slip thereon, even if greasy.

In cooking, the melted fat rises through the perforations 3, and the heat thereof tends to maintain the same temperature above as below the slices. Occasional rotations of the grid, as aforesaid, help to promote such uniformity of heat. And it is noticed that the cook may watch the progress of the cooking through the perforations 3 without fear of getting the underside burned before the upper surfaces of the slices are done.

When the bacon is cooked to suit the individual taste, it is merely required to lift the grid out of the skillet and, in doing this, gradually to tilt the grid until it approaches vertical position. It may be held in this position until all the free fat is drained off, whereupon the grid is taken to a serving dish and again returned to its horizontal position above this dish. A few light taps on the edge of the grid causes the slices to slip off the pins and they are deposited on the dish without a curl in them. Equally important, it is found that the slices show no shrinkage; they have been so firmly stretched on the pins that no appreciable shrinkage could take place.

Should it be found, however, in case very thin slices of bacon are cooked, that the pins fail securely to maintain the slices in position on the grid, while lifting it out of the skillet, it is only required to modify the shape of the pins, substantially as indicated in Figs. 5 and 6. It is noticed that the pins, in the drawing, are bent in different directions, the aim being so to direct them that some of the pins seated in each slice of bacon are bent in opposite directions. When so directed, it is found that the cooked slices are securely held during transfer to the serving dish, but it is still possible, by tapping the edge of the grid, to dislodge them therefrom.

From the foregoing description, it is seen that I have provided an attachment in the form of a grid which may be placed within a skillet or other cooking utensil in which meat slices have been placed, and that pins depend therefrom to penetrate the meat slices. Furthermore that these pins maintain the slices stretched so that they prevent curling up thereof. Also that the pins maintain the slices anchored to the grid so that the latter may be rotated in the skillet, carrying with it the slices which, in this manner become more uniformly cooked. Finally, that the pins cause the slices to adhere to the grid while transferring the slices to the serving dish, but that vibrations caused by shaking the dish or tapping the edge thereof suffice to dislodge the slices.

While I have above described preferred forms of the invention, I do not wish to be limited to the exact details of construction, but reserve the right to embody further modifications within the scope of the claim hereto appended.

I claim:

In combination with a skillet for frying bacon and the like, a disc loosely placeable within said skillet and having a number of circular perforations therethrough, pins projecting from the bottom of the disc to penetrate the bacon slices in the skillet, the projecting portion of said pins being so bent that each shank thereof is inclined in a direction different from the adjacent pins, and a handle rising centrally from the top of the disc for rotating the disc and the bacon slices held by the pins thereof and for lifting the disc with the bacon adhering thereto out of the skillet, tapping the edge of the skillet causing the bacon slices to slip off the pins.

OMAR SUTTLES.